United States Patent
Li et al.

(10) Patent No.: US 8,786,674 B2
(45) Date of Patent: Jul. 22, 2014

(54) METHOD FOR PERFORMING VIDEO DISPLAY CONTROL WITHIN A VIDEO DISPLAY SYSTEM, AND ASSOCIATED VIDEO PROCESSING CIRCUIT AND VIDEO DISPLAY SYSTEM

(75) Inventors: Guoping Li, Hefei (CN); Chin-Jung Yang, Hsinchu (TW); Geng Li, Hefei (CN); Te-Chi Hsiao, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 500 days.

(21) Appl. No.: 13/130,755

(22) PCT Filed: Nov. 26, 2010

(86) PCT No.: PCT/CN2010/079184
§ 371 (c)(1),
(2), (4) Date: May 23, 2011

(87) PCT Pub. No.: WO2012/068742
PCT Pub. Date: May 31, 2012

(65) Prior Publication Data
US 2012/0133732 A1    May 31, 2012

(51) Int. Cl.
*H04N 13/00* (2006.01)
*G09G 5/36* (2006.01)
(52) U.S. Cl.
CPC . *G09G 5/36* (2013.01); *H04N 13/00* (2013.01)
USPC .......................................................... 348/43
(58) Field of Classification Search
USPC .................................................. 348/41–161
See application file for complete search history.

(56) References Cited

U.S. PATENT DOCUMENTS

| 6,567,091 | B2 * | 5/2003 | Dye et al. ...................... 345/501 |
| 7,262,818 | B2 * | 8/2007 | Chuang et al. ................ 348/790 |
| 7,317,868 | B2 * | 1/2008 | Oshima et al. ................ 386/329 |
| 2002/0135585 | A1 * | 9/2002 | Dye et al. ...................... 345/531 |
| 2003/0108341 | A1 * | 6/2003 | Oshima et al. ................ 386/125 |

(Continued)

FOREIGN PATENT DOCUMENTS

| CN | 1414794 A | 4/2003 |
| CN | 1414795 A | 4/2003 |

(Continued)

OTHER PUBLICATIONS

International application No. PCT/CN2010/079184, International filing date: Nov. 26, 2010, International Searching Report mailing date: Apr. 28, 2011.

*Primary Examiner* — Sath V Perungavoor
*Assistant Examiner* — Talha Nawaz
(74) *Attorney, Agent, or Firm* — Winston Hsu; Scott Margo

(57) ABSTRACT

A method for performing video display control within a video display system includes: dynamically utilizing two of a plurality of buffers as on-screen buffers for three-dimensional (3D) frames, wherein the plurality of buffers is positioned within the video display system; and during utilizing any of the two of the plurality of buffers as an on-screen buffer, dynamically utilizing at least one other buffer of the plurality of buffers as at least one off-screen buffer for at least one 3D frame. An associated video processing circuit and an associated video display system are also provided. In particular, the video processing circuit is positioned within the video display system, where the video processing circuit operates according to the method.

33 Claims, 17 Drawing Sheets

(56) References Cited

U.S. PATENT DOCUMENTS

| | | |
|---|---|---|
| 2003/0133007 A1 | 7/2003 | Iijima |
| 2004/0196289 A1* | 10/2004 | Langendorf et al. .......... 345/502 |
| 2006/0192746 A1* | 8/2006 | Ioki et al. ...................... 345/102 |
| 2007/0035831 A1 | 2/2007 | Novelo |
| 2007/0195408 A1* | 8/2007 | Divelbiss et al. ............. 359/462 |
| 2009/0322784 A1* | 12/2009 | Sartori .......................... 345/619 |
| 2011/0050862 A1* | 3/2011 | Cheng et al. ................... 348/51 |
| 2011/0157334 A1* | 6/2011 | Kim et al. ...................... 348/56 |
| 2011/0181700 A1* | 7/2011 | Oshima et al. ................. 348/43 |
| 2011/0182363 A1* | 7/2011 | Lin et al. .................. 375/240.25 |
| 2012/0050280 A1* | 3/2012 | Kim .............................. 345/419 |
| 2012/0050462 A1* | 3/2012 | Liu et al. ........................ 348/43 |

FOREIGN PATENT DOCUMENTS

| | | |
|---|---|---|
| CN | 1450816 A | 10/2003 |
| CN | 100456328 C | 1/2009 |
| CN | 101415126 A | 4/2009 |
| CN | 101540926 B | 10/2010 |

* cited by examiner

METHOD FOR PERFORMING VIDEO DISPLAY CONTROL WITHIN A VIDEO DISPLAY SYSTEM, AND ASSOCIATED VIDEO PROCESSING CIRCUIT AND VIDEO DISPLAY SYSTEM

BACKGROUND OF THE INVENTION

1. Field of the Invention

The present invention relates to three-dimensional (3D) display control, and more particularly, to a method for performing video display control within a video display system, and to an associated video processing circuit and an associated video display system.

2. Description of the Related Art

Display control is an important issue in a conventional 3D display system. According to the related art, in a situation where the buffering module for temporarily storing 3D frames to be displayed is not properly controlled, some problems may occur. For example, the so-called tearing artifact may occur when a conventional video processing circuit in the conventional 3D display system is not properly designed, giving the user a bad viewing experience. More particularly, in order to expand the market share, manufacturing some products equipped with associated hardware resources that are implemented with cheap or low end components may be required. However, utilizing these cheap or low end components typically brings some side effects. As a result, the conventional 3D display system typically does not serve the user well. Thus, a novel method is required for enhancing the display control of a video display system.

BRIEF SUMMARY OF THE INVENTION

It is therefore an objective of the claimed invention to provide a method for performing video display control within a video display system, and to provide an associated video processing circuit and an associated video display system, in order to solve the above-mentioned problems.

It is another objective of the claimed invention to provide a method for performing video display control within a video display system, and to provide an associated video processing circuit and an associated video display system, in order to achieve the best overall performance.

It is another objective of the claimed invention to provide a method for performing video display control within a video display system, and to provide an associated video processing circuit and an associated video display system, in order to maintain the overall performance even in a situation where associated hardware resources are implemented with cheap or low end components.

An exemplary embodiment of a method for performing video display control within a video display system comprises: dynamically utilizing two of a plurality of buffers as on-screen buffers for three-dimensional (3D) frames, wherein the plurality of buffers is positioned within the video display system; and during utilizing any of the two of the plurality of buffers as an on-screen buffer, dynamically utilizing at least one other buffer of the plurality of buffers as at least one off-screen buffer for at least one 3D frame.

An exemplary embodiment of an associated video processing circuit is provided, where the video processing circuit is positioned within a video display system. The video processing circuit comprises a demultiplexer, two video decoders, a buffering module, and a controller, where the controller is arranged to control operations of the video processing circuit. The demultiplexer is arranged to demultiplex a 3D video stream into a left video stream and a right video stream, and the two video decoders are arranged to respectively decode the left video stream and the right video stream to generate a plurality of 3D frames. In addition, the buffering module is arranged to temporarily store the 3D frames, wherein the buffering module comprises a plurality of buffers. Under control of the controller, the buffering module dynamically utilizes two of the plurality of buffers as on-screen buffers for at least a portion of the 3D frames. Additionally, under control of the controller, during utilizing any of the two of the plurality of buffers as an on-screen buffer, the buffering module dynamically utilizes at least one other buffer of the plurality of buffers as at least one off-screen buffer for at least one 3D frame.

An exemplary embodiment of an associated video display system comprises a video processing circuit, where the video processing circuit comprises a demultiplexer, two video decoders, a buffering module, and a controller, and the controller is arranged to control operations of the video processing circuit. The demultiplexer is arranged to demultiplex a 3D video stream into a left video stream and a right video stream, and the two video decoders are arranged to respectively decode the left video stream and the right video stream to generate a plurality of 3D frames. In addition, the buffering module is arranged to temporarily store the 3D frames, wherein the buffering module comprises a plurality of buffers. Under control of the controller, the buffering module dynamically utilizes two of the plurality of buffers as on-screen buffers for at least a portion of the 3D frames. Additionally, under control of the controller, during utilizing any of the two of the plurality of buffers as an on-screen buffer, the buffering module dynamically utilizes at least one other buffer of the plurality of buffers as at least one off-screen buffer for at least one 3D frame.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
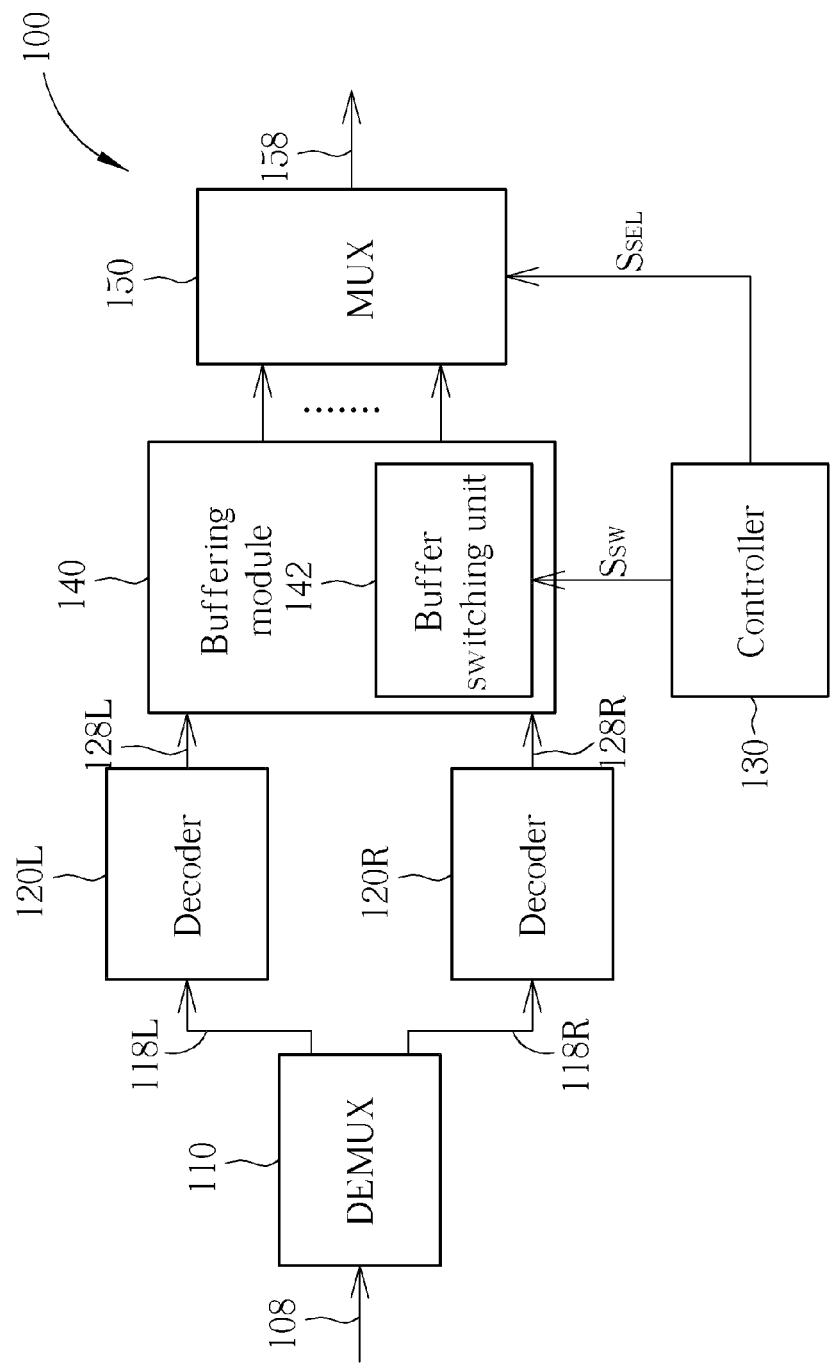
FIGS. 1A-1B respectively illustrate a video display system and the combination of the video display system and an associated three-dimensional (3D) display device according to a first embodiment of the present invention.

Please refer to FIG. 1A, which illustrates a diagram of a video display system 100 according to a first embodiment of the present invention. As shown in FIG. 1A, the video display system 100 comprises a video processing circuit comprising a demultiplexer 110 (labeled "DEMUX" in FIG. 1A), two video decoders 120L and 120R, a controller 130, a buffering module 140, and a multiplexer 150 (labeled "MUX" in FIG. 1A), where the controller 130 is arranged to control operations of the video processing circuit mentioned above. In this embodiment, the buffering module 140 comprises a buffering switching unit 142 and a plurality of buffers 144 (not shown in FIG. 1A). For example, the buffering switching unit 142 can be implemented by some switching circuits that operate according to at least one switching control signal $S_{SW}$. In another example, the buffering switching unit 142 can be implemented by an interface circuit arranged to control access to the buffers 144 according to the switching control signal $S_{SW}$.

According to this embodiment, the demultiplexer 110 is arranged to demultiplex a three-dimensional (3D) video stream 108 into a left video stream 118L and a right video stream 118R, and the two video decoders 120L and 120R are arranged to respectively decode the left video stream 118L and the right video stream 118R to generate a plurality of 3D frames to be displayed. For example, the 3D frames can be generated based upon decoded data 128L and 128R. In another example, the 3D frames can be obtained from the decoded data 128L and 128R. In another example, the 3D frames can be generated based upon decoded data 128L and 128R and/or can be obtained from the decoded data 128L and 128R. In addition, the buffering module 140 is arranged to temporarily store the 3D frames. Under the control of the controller 130, and more particularly, the control of the switching control signal $S_{SW}$, the buffering module 140 can dynamically utilize two of the plurality of buffers 144 as on-screen buffers for at least a portion of the 3D frames. Additionally, under the control of the controller 130, and more particularly, the control of the switching control signal $S_{SW}$, during utilizing any of the two of the plurality of buffers 144 as an on-screen buffer, the buffering module 140 can dynamically utilize at least one other buffer of the plurality of buffers 144 as at least one off-screen buffer for at least one 3D frame.

In practice, the buffering module 140 can respectively utilize the two of the plurality of buffers 144 as on-screen buffers in different periods such as different vertical synchronization periods (e.g. different periods of a vertical synchronization signal VSYNC), with the aid of the multiplexer 150. More specifically, according to a selection signal $S_{SEL}$ from the controller 130, the multiplexer 150 is arranged to multiplex an output of one of the buffers 144, and more particularly, the output of a buffer of the two of the buffers 144. For example, in a situation where the two of the buffers 144 comprise a first buffer Buf(1) and a second buffer Buf(2), the multiplexer 150 can multiplex the output of the first buffer Buf(1) as a first 3D frame to be displayed first, and then multiplex the output of the second buffer Buf(2) as a second 3D frame to be displayed later, where all of the 3D frames to be displayed are output through the output frame signal 158. The controller 130 may control the selection signal $S_{SEL}$ to be in one of a plurality of states respectively corresponding to the buffers 144, in order to notify the multiplexer 150 of the output of a specific buffer to be selected at that moment.

Figure 1B:
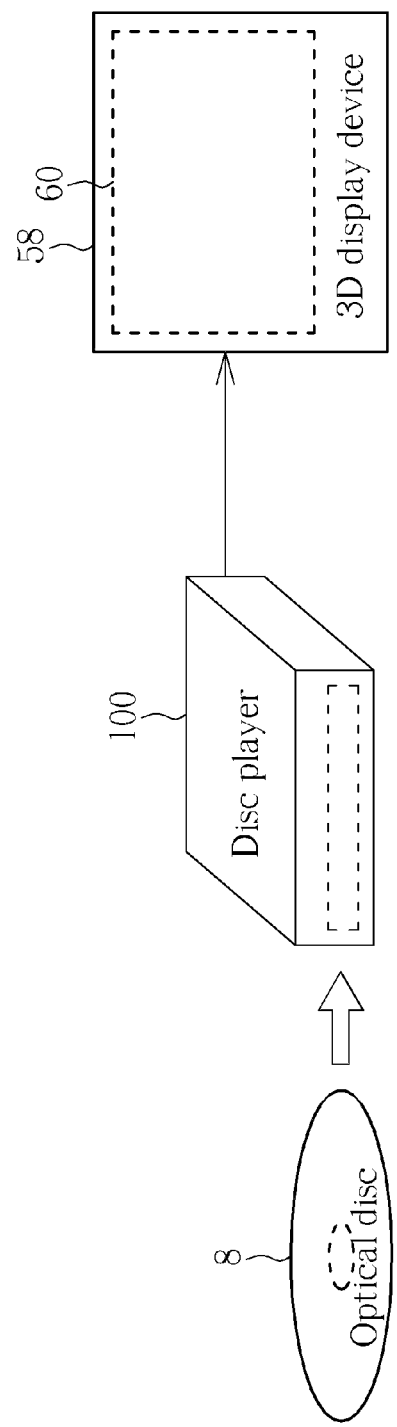
Figure 2A:
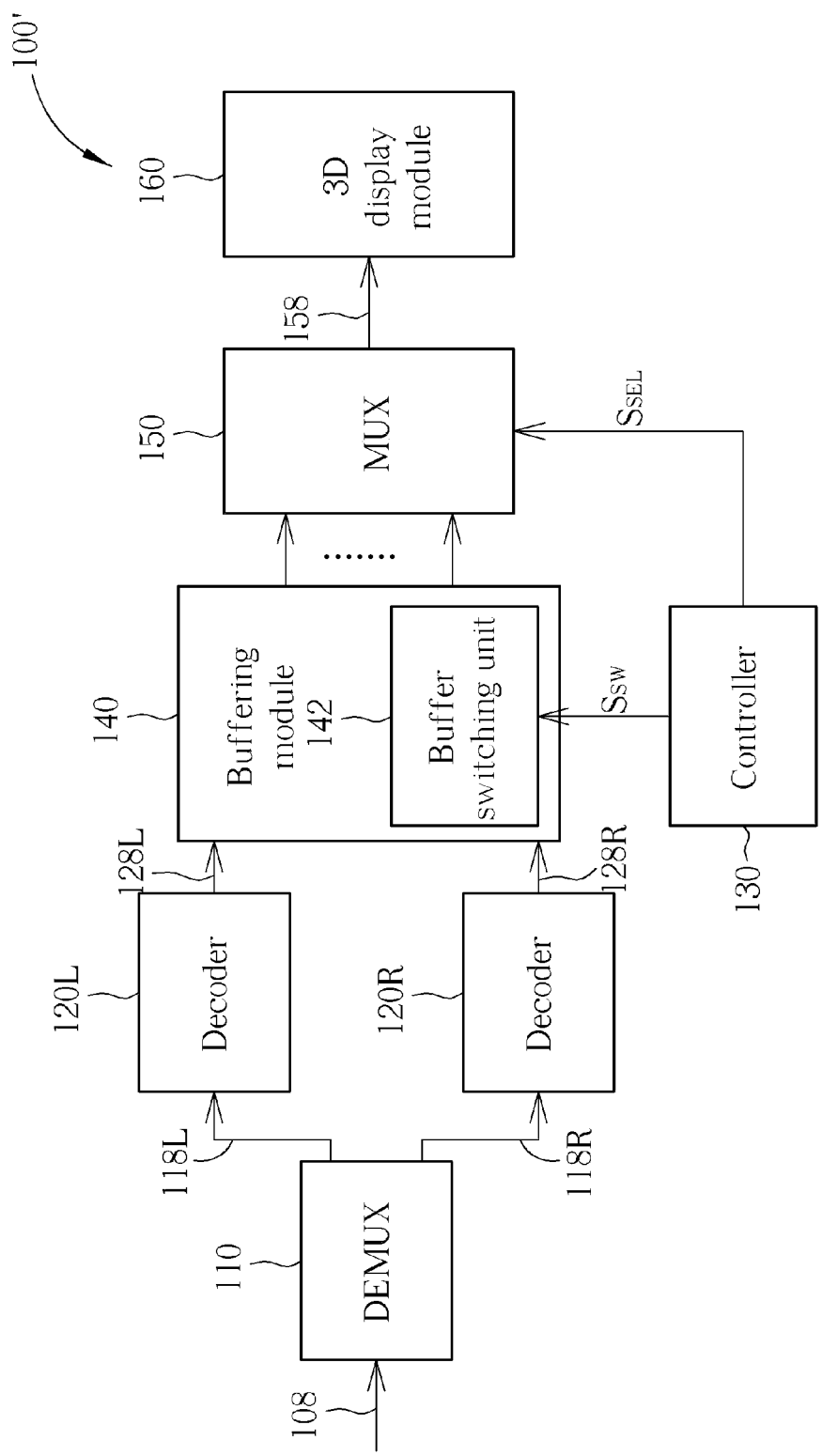
FIGS. 2A-2B respectively illustrate a video display system and an associated television (TV) station according to a second embodiment of the present invention.
Figure 2B:
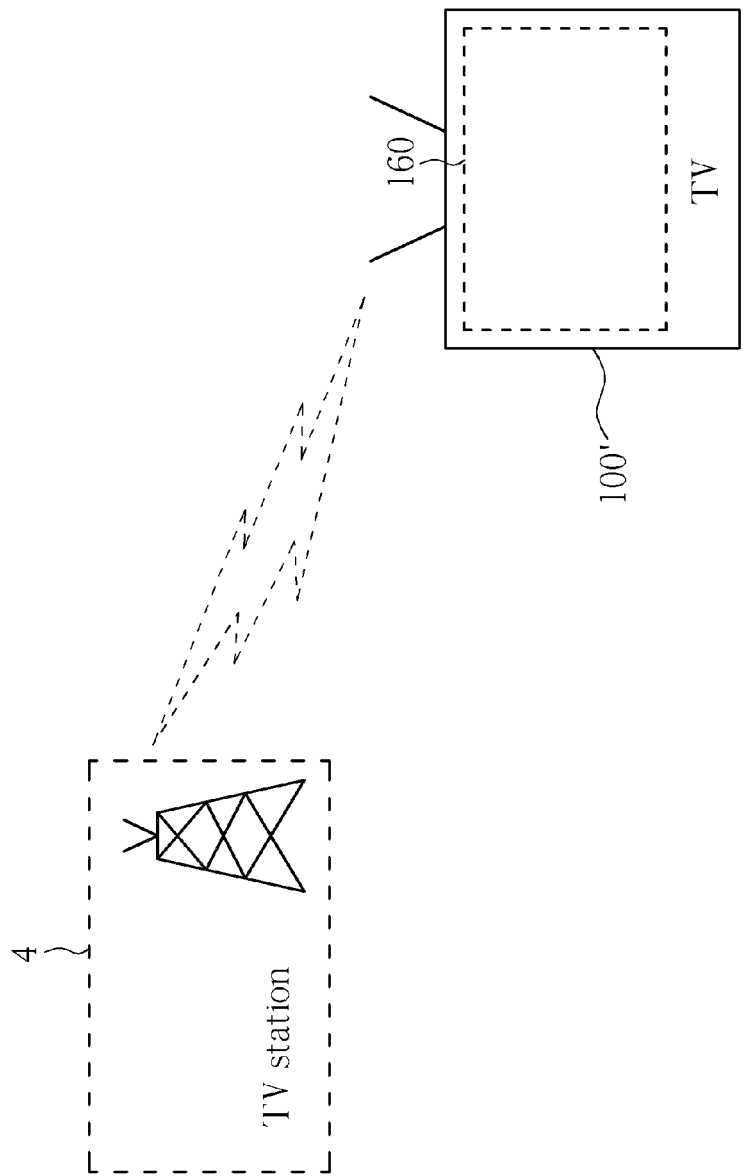

In this embodiment, a disc player capable of accessing an optical disc 8 storing 3D program/contents is taken as an example of the video display system 100, and therefore, the video display system 100 can be labeled "Disc player" in FIG. 1B. The video display system 100 can be coupled to a 3D display device 58 comprising a display module 60 such as a 3D display module for displaying the 3D frames mentioned above. This is for illustrative purposes only, and is not meant to be a limitation of the present invention. According to a variation of this embodiment, such as a second embodiment shown in FIGS. 2A-2B, the 3D display module for displaying the 3D frames mentioned above can be implemented within the aforementioned video display system, which is labeled with the numeral 100' in response to the change in architecture. For example, the 3D display module implemented within the video display system 100' can be the 3D display module 160 shown in FIG. 2A. In this variation, a television (TV) capable of receiving broadcasting signals from a TV station 4 that can broadcast 3D program/contents is taken as an example of the video display system 100', and therefore, the video display system 100' can be labeled "TV" in FIG. 2B.

Figure 3A:
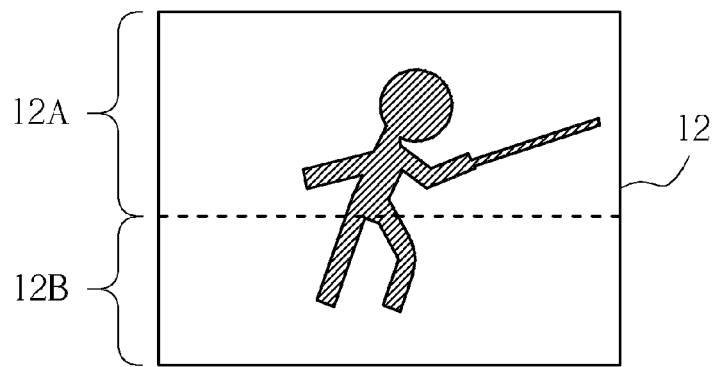
FIGS. 3A-3B respectively illustrate two 3D frames according to an embodiment of the present invention.
Figure 3B:
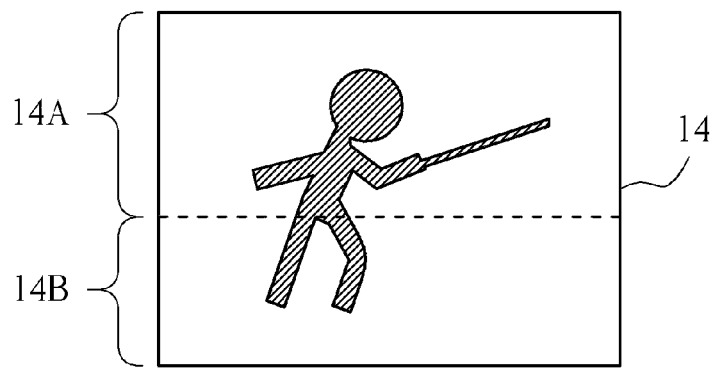
Figure 3C:
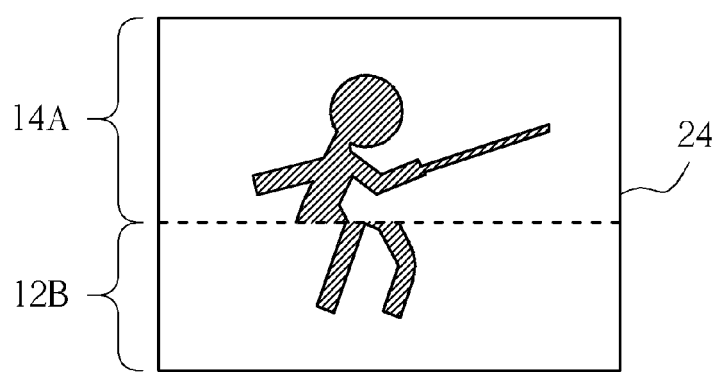
FIG. 3C illustrates an erroneous display result of a conventional video display system according to the related art.

FIGS. 3A-3B respectively illustrate two 3D frames 12 and 14 according to an embodiment of the present invention. For example, the two 3D frames 12 and 14 represent the aforementioned first 3D frame to be displayed first and the aforementioned second 3D frame to be displayed later, respectively. More particularly, the 3D frame 12 is a left 3D frame to be displayed for the left eye of the user and the 3D frame 14 is a right 3D frame to be displayed for the right eye of the user. Base upon the architecture of the first embedment (or a variation thereof, such as the second embodiment), related art problems such as the so-called tearing artifact will no longer be an issue. More specifically, an improper display result of the related art, such as the erroneous display result 24 shown in FIG. 3C, will never occur in any video display system implemented according to the present invention, where the erroneous display result 24 is formed with an upper portion 14A of the two portions 14A and 14B of the 3D frame 14 and a lower portion 12B of the two portions 12A and 12B of the 3D frame 12. Base upon the architecture of the first embedment (or a variation thereof, such as the second embodiment), the overall performance can be maintained, even in a situation where associated hardware resources are implemented with cheap or low end components.

Figure 4:
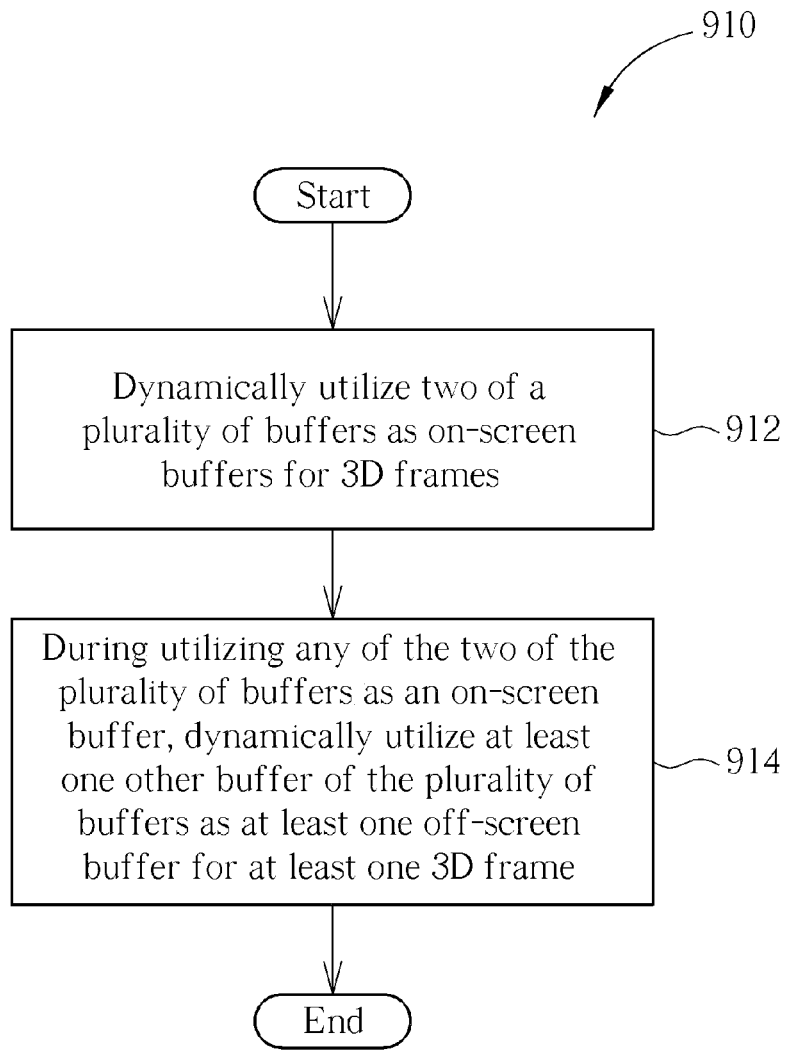
FIG. 4 is a flowchart of a method for performing video display control within a video display system according to one embodiment of the present invention.

FIG. 4 is a flowchart of a method 910 for performing video display control within a video display system such as that mentioned above according to one embodiment of the present invention. The method 910 shown in FIG. 4 can be applied to the video display system 100 shown in FIG. 1A (or the video display system 100' shown in FIG. 2A), and more particularly, can be applied to the video processing circuit of any of the first embodiment and the second embodiment (and variations thereof). The method is described as follows.

In Step 912, the video processing circuit (and more particularly, the buffering module 140, under the control of the controller 130) dynamically utilizes two of a plurality of buffers, such as the two of the plurality of buffers 144 mentioned above, as on-screen buffers for at least a portion of the 3D frames. For example, under the control of the switching control signal $S_{SW}$ from the controller 130, the buffering module 140 dynamically utilizes the two of the plurality of buffers 144 as on-screen buffers for at least a portion of the 3D frames.

In Step 914, during utilizing any of the two of the plurality of buffers 144 as an on-screen buffer, the video processing circuit (and more particularly, the buffering module 140, under the control of the controller 130) dynamically utilizes at least one other buffer of the plurality of buffers 144 as at least one off-screen buffer for at least one 3D frame. For example, under the control of the switching control signal $S_{SW}$ from the controller 130, during utilizing any of the two of the plurality of buffers 144 as an on-screen buffer, the buffering module 140 dynamically utilizes at least one other buffer of the plurality of buffers 144 as at least one off-screen buffer for at least one 3D frame.

According some variations of this embodiment, the working flow comprising Step 912 and Step 914 can be repeated. According some variations of this embodiment, a portion of operations of Step 912 and/or a portion of operations of Step 914 can be rearranged to be within at least one individual step. According some variations of this embodiment, a portion of operations of Step 912 and/or a portion of operations of Step 914 can be rearranged to be within an existing step.

In general, the number of the plurality of buffers 144 involved with the method 910 shown in FIG. 4 can be an even number or an odd number. For example, the number of the plurality of buffers 144 can be an even number in some embodiments of the present invention, such as the embodiment shown in FIG. 5 and some variations thereof. In another example, the number of the plurality of buffers 144 can be an odd number in some other embodiments of the present invention, such as the embodiments respectively shown in FIGS. 6A-6D and FIGS. 7A-7D and some variations thereof.

Figure 5:
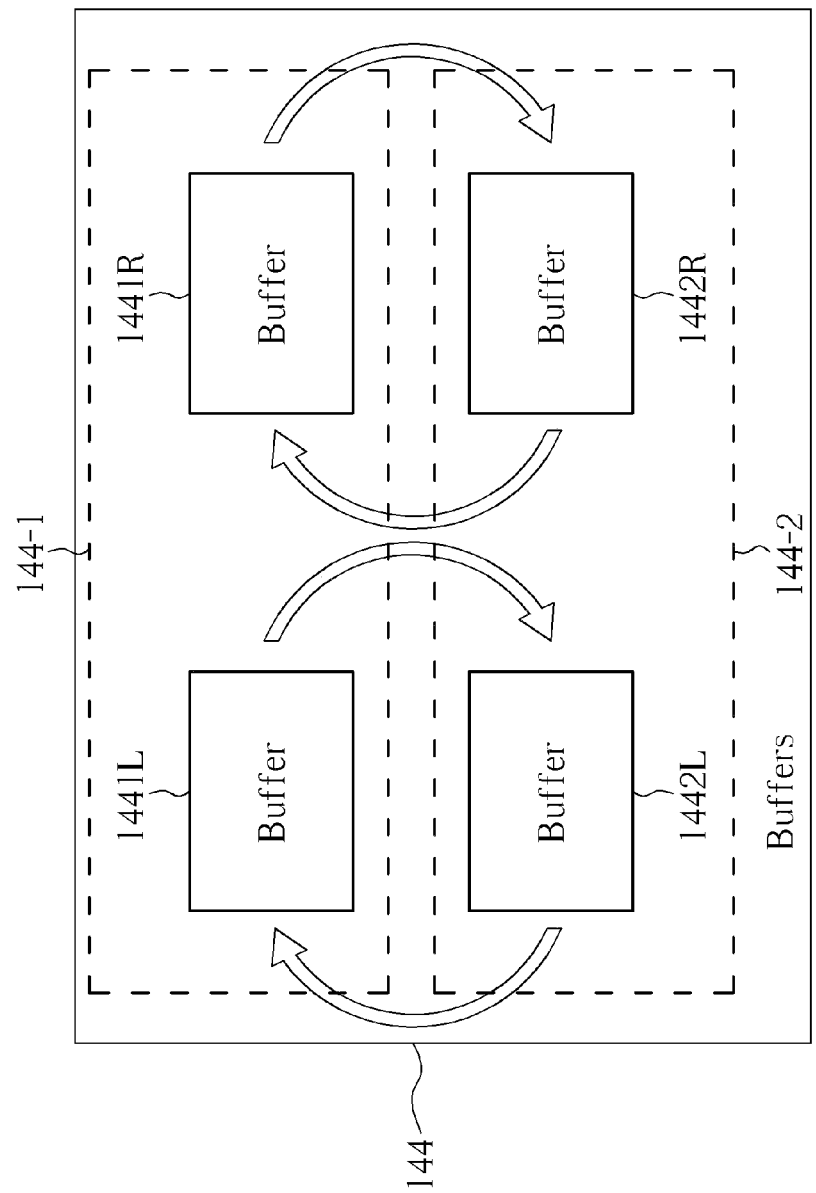
FIG. 5 illustrates exemplary buffer control of a plurality of buffers involved with the method shown in FIG. 4 according to an embodiment of the present invention.

As shown in FIG. 5, the number of the plurality of buffers 144 can be equal to four, where the buffers 144 comprise a first set of buffers 1441L and 1441R and a second set of buffers 1442L and 1442R. More particularly, the buffers 1441L and 1442L are utilized for temporarily storing left 3D frames to be displayed for the left eye of the user, and the buffers 1441R and 1442R are utilized for temporarily storing right 3D frames to be displayed for the right eye of the user.

In practice, under the control of the controller 130, and more particularly, the control of the switching control signal $S_{SW}$, when the buffering module 140 utilizes one of the buffers 1441L and 1442L as an on-screen buffer, the buffering module 140 utilizes the other of the buffers 1441L and 1442L as an off-screen buffer. For example, when the buffering module 140 utilizes the buffer 1441L as an on-screen buffer, the buffering module 140 utilizes the buffer 1442L as an off-screen buffer. In another example, when the buffering module 140 utilizes the buffer 1442L as an on-screen buffer, the buffering module 140 utilizes the buffer 1441L as an off-screen buffer.

Similarly, under the control of the controller 130, and more particularly, the control of the switching control signal $S_{SW}$, when the buffering module 140 utilizes one of the buffers 1441R and 1442R as an on-screen buffer, the buffering module 140 utilizes the other of the buffers 1441R and 1442R as an off-screen buffer. For example, when the buffering module 140 utilizes the buffer 1441R as an on-screen buffer, the buffering module 140 utilizes the buffer 1442R as an off-screen buffer. In another example, when the buffering module 140 utilizes the buffer 1442R as an on-screen buffer, the buffering module 140 utilizes the buffer 1441R as an off-screen buffer.

As a result, only one of the buffers 1441L and 1442L can be utilized as an on-screen buffer at a time, and only one of the buffers 1441R and 1442R can be utilized as an on-screen buffer at a time, where the two of the plurality of buffers 144 mentioned in Step 912 comprise one of the buffers 1441L and 1442L and further comprise one of the buffers 1441R and 1442R, for outputting a set of 3D frames to be displayed respectively for the two eyes (i.e. a left 3D frame and a right 3D frame). The numeral 144-1 is utilized for representing the two of the plurality of buffers 144 mentioned in Step 912 at a specific moment, and the numeral 144-2 is utilized for representing the at least one other buffer of the plurality of buffers 144 mentioned in Step 914 at this specific moment.

Figure 6A:
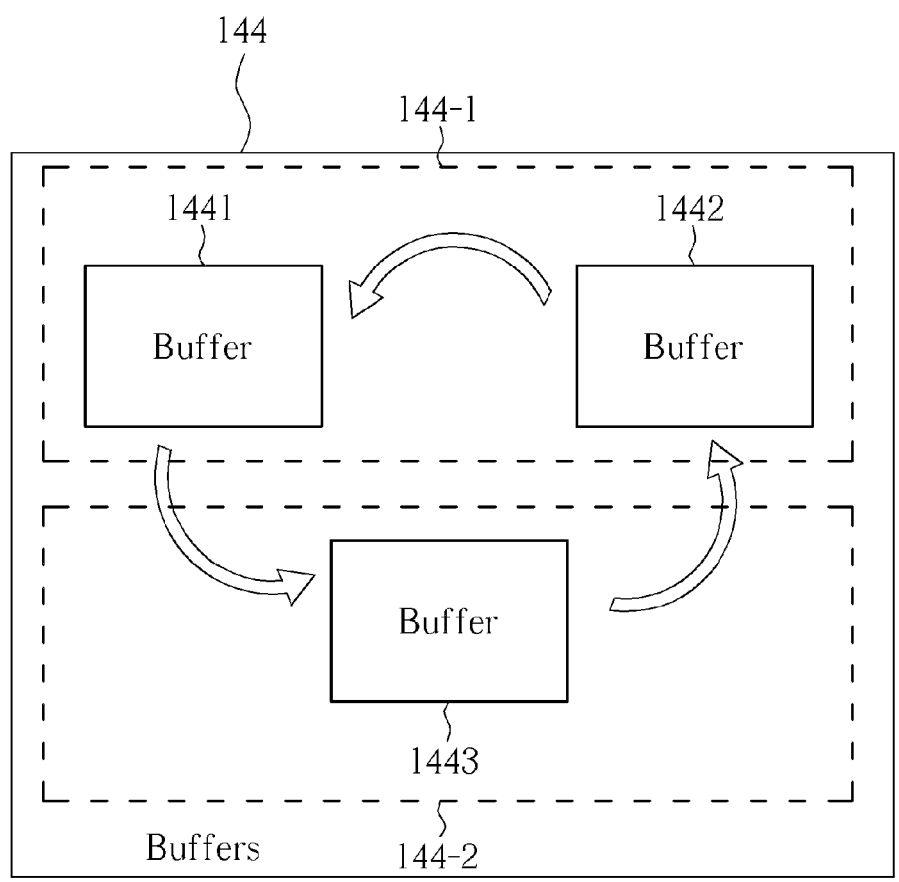
FIGS. 6A-6D illustrate exemplary buffer control of a plurality of buffers involved with the method shown in FIG. 4 according to another embodiment of the present invention.

Referring to FIG. 6A, the number of the plurality of buffers 144 can be equal to three, where the buffers 144 comprise buffers 1441, 1442, and 1443. More particularly, referring to the upper portion 144-1 shown in FIG. 6A, two of the buffers 1441, 1442, and 1443 are selected as the two of the plurality of buffers 144 mentioned in Step 912 at a specific moment. In addition, referring to the lower portion 144-2 shown in FIG. 6A, the other of the buffers 1441, 1442, and 1443 is selected as the at least one other buffer of the plurality of buffers 144 mentioned in Step 914 at this specific moment. For better comprehension, FIG. 6A illustrates an exemplary situation where the buffers 1441 and 1442 are selected as the two of the plurality of buffers 144 mentioned in Step 912 and the buffer 1443 is selected as the at least one other buffer of the plurality of buffers 144 mentioned in Step 914 at this specific moment.

In practice, under the control of the controller 130, and more particularly, the control of the switching control signal $S_{SW}$, in a situation where the buffering module 140 utilizes two of the buffers 1441, 1442, and 1443 as two on-screen buffer respectively storing a left 3D frame to be displayed for the left eye of the user and a right 3D frame to be displayed for the right eye of the user, the buffering module 140 utilizes the other buffer of the buffers 1441, 1442, and 1443 as an off-screen buffer. For example, in a situation where the buffering module 140 utilizes the buffers 1441 and 1442 as the two on-screen buffer respectively storing a left 3D frame to be displayed for the left eye of the user and a right 3D frame to be displayed for the right eye of the user, the buffering module 140 utilizes the other buffer 1443 as an off-screen buffer. As a result, the buffers 1441 and 1442 are arranged to output a set of 3D frames to be displayed respectively for the two eyes (e.g. the left 3D frame and the right 3D frame).

Figure 6B:
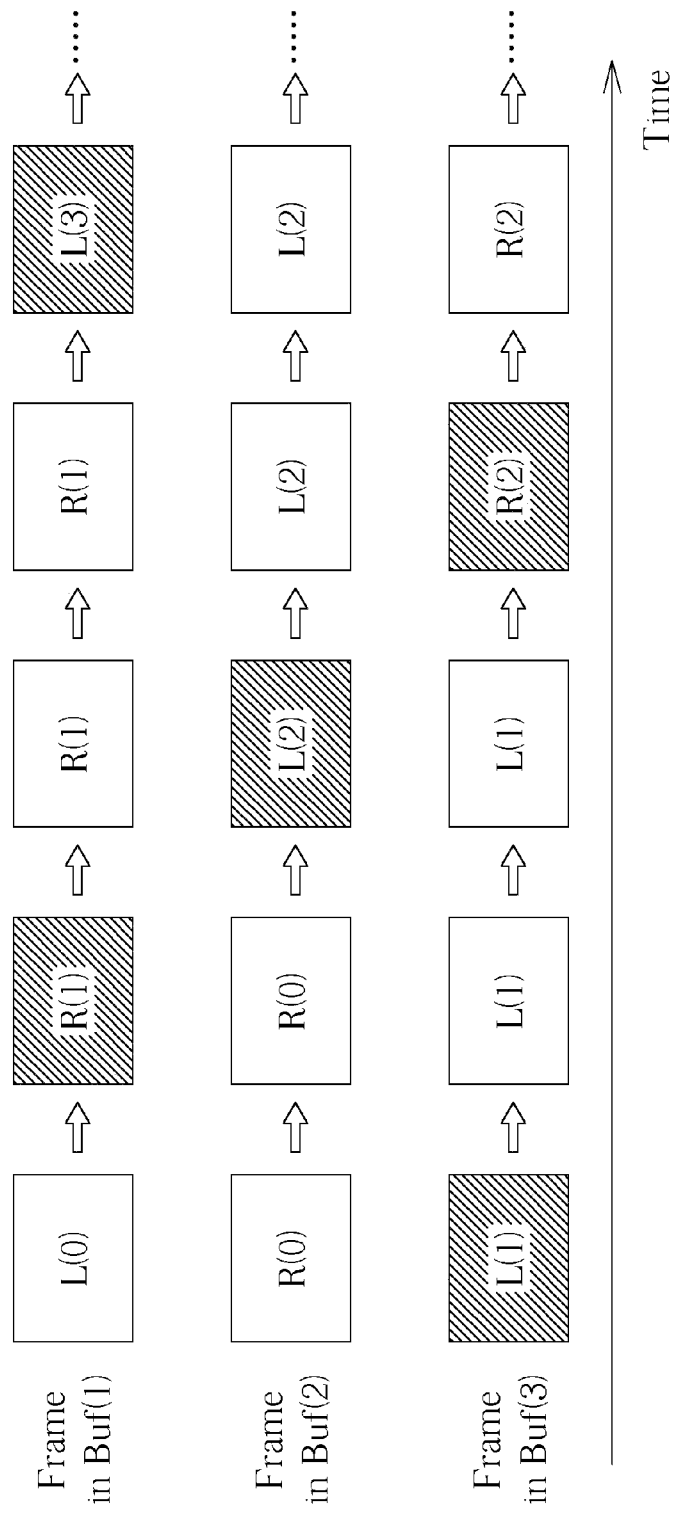

Referring to FIG. 6B, suppose that the notations Buf(1), Buf(2), and Buf(3) are utilized for representing the buffers 1441, 1442, and 1443, respectively. In addition, the notations L(i) and R(i) are respectively utilized for representing left and right 3D frames, where i can be an integer, and more particularly, can be a non-negative integer. When the buffers Buf(1) and Buf(2) respectively store a left 3D frame L(0) and a right 3D frame R(0), the buffer Buf(3) can be utilized for drawing the next left 3D frame L(1), and is therefore illustrated with a shaded block for better comprehension. Each transition of the contents of the buffers Buf(1), Buf(2), and Buf(3) corresponds to a vertical synchronization signal such as the aforementioned vertical synchronization signal VSYNC (not shown in FIG. 6B). As a result of applying the method 910 shown in FIG. 4, the content of the buffer Buf(1) in different periods of the vertical synchronization signal VSYNC can be the associated 3D frames in the sequence {L(0), R(1), R(1), R(1), L(3), ... }, respectively. In addition, the content of the buffer Buf(2) in different periods of the vertical synchronization signal VSYNC can be the associated 3D frames in the sequence {R(0), R(0), L(2), L(2), L(2), ... }, respectively. Additionally, the content of the buffer Buf(3) in different periods of the vertical synchronization signal VSYNC can be the associated 3D frames in the sequence {L(1), L(1), L(1), R(2), R(2), ... }, respectively.

Figure 6C:
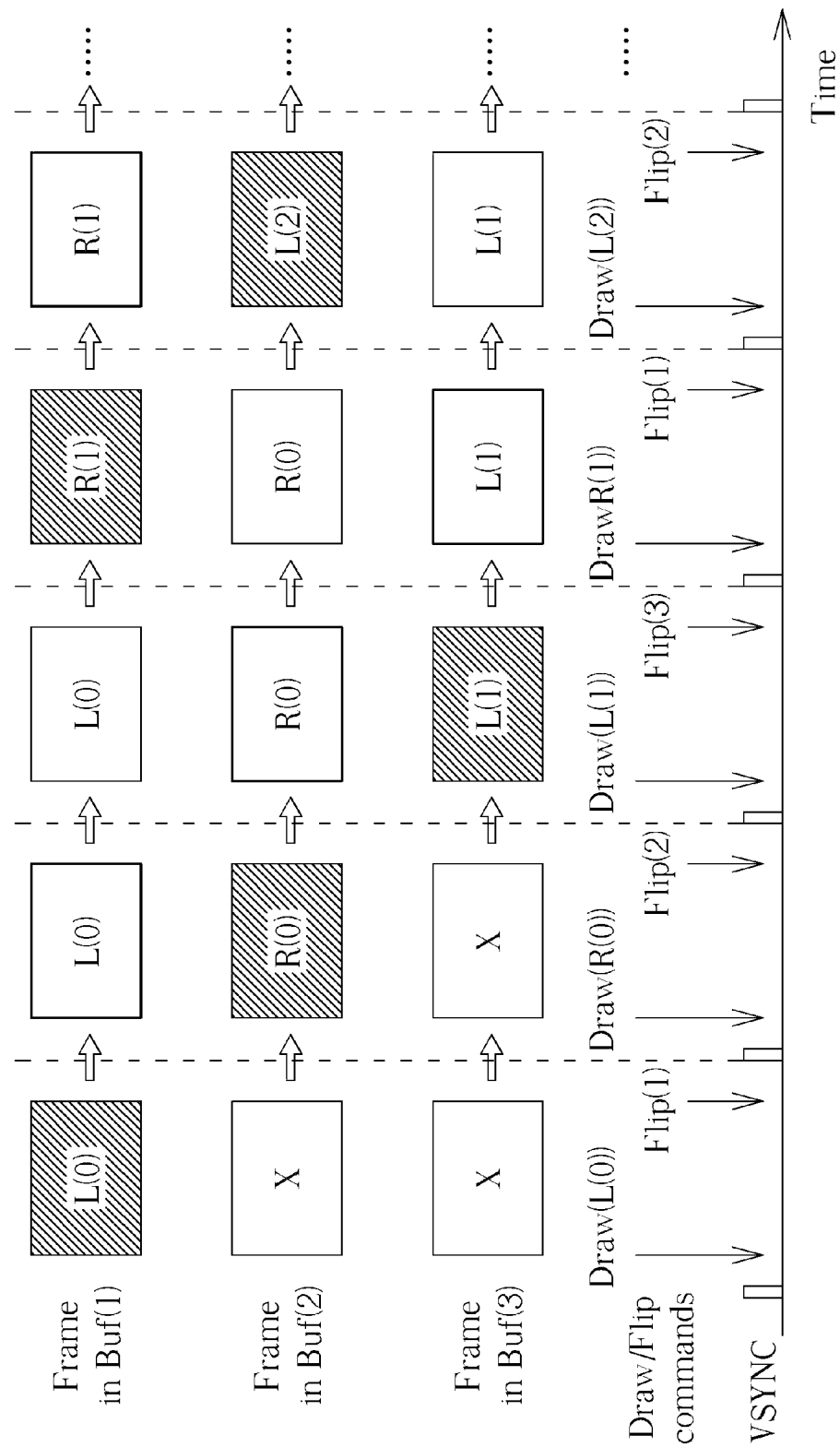

Referring to FIG. 6C, the vertical synchronization signal VSYNC is illustrated for reference, where each transition of the contents of the buffers Buf(1), Buf(2), and Buf(3) corresponds to a pulse of the vertical synchronization signal VSYNC. Some drawing commands such as the drawing commands DRAW(L(0)), DRAW(R(0)), DRAW(L(1)), DRAW(R(1)), DRAW(L(2)), DRAW(R(2)), ..., etc. are respectively utilized for drawing the 3D frames L(0), R(0), L(1), R(1), L(2), R(2), ..., etc., some of which are illustrated with shaded blocks for better comprehension. In addition, some flip commands such as the flip commands Flip(1), Flip(2), and Flip(3) are respectively utilized for flipping the buffers Buf(1), Buf(2), and Buf(3) to be on-screen buffers (which are illustrated with blocks depicted using bold lines) at the time points of the respective coming pulses of the vertical synchronization signal VSYNC. Additionally, the notation X shown in FIG. 6C represents the meaning of "undefined" (or undetermined) in this embodiment, where the buffer contents labeled with the notation X are typically undefined (or undetermined).

Please note that, in this embodiment, when one of the buffers Buf(1), Buf(2), and Buf(3) is just flipped to be an on-screen buffer, the buffer storing the content that has just been removed from the screen becomes in an off-screen state. This is for illustrative purposes only, and is not meant to be a limitation of the present invention. According to a variation of this embodiment, in a situation where the number of the buffers 144 is greater than three, the two of the plurality of buffers 144 mentioned in Step 912 (e.g. the upper portion 144-1 shown in FIG. 6A) can be in an on-screen state at the same time at the aforementioned specific moment, and the at least one other buffer of the plurality of buffers 144 mentioned in Step 914 can be in an off-screen state at this specific moment. In addition, at the end of the current period, such as the time point when the coming pulse of the vertical synchronization period VSYNC appears, the original two buffers that are regarded as the two of the plurality of buffers 144 mentioned in Step 912 then enter an off-screen state at the same time, where some other two of the buffers 144 replace the original two buffers and become in an on-screen state at the same time.

In addition, some drawing commands such as the drawing commands DRAW(L(0)), DRAW(R(0)), DRAW(L(1)), DRAW(R(1)), DRAW(L(2)), DRAW(R(2)), ..., etc. are taken as examples of the associated commands for generating/obtaining the latest 3D frames in the embodiment shown in FIG. 6C. This is for illustrative purposes only, and is not meant to be a limitation of the present invention. According to a variation of this embodiment, other kinds of commands can be utilized for generating/obtaining the latest 3D frames.

Figure 6D:
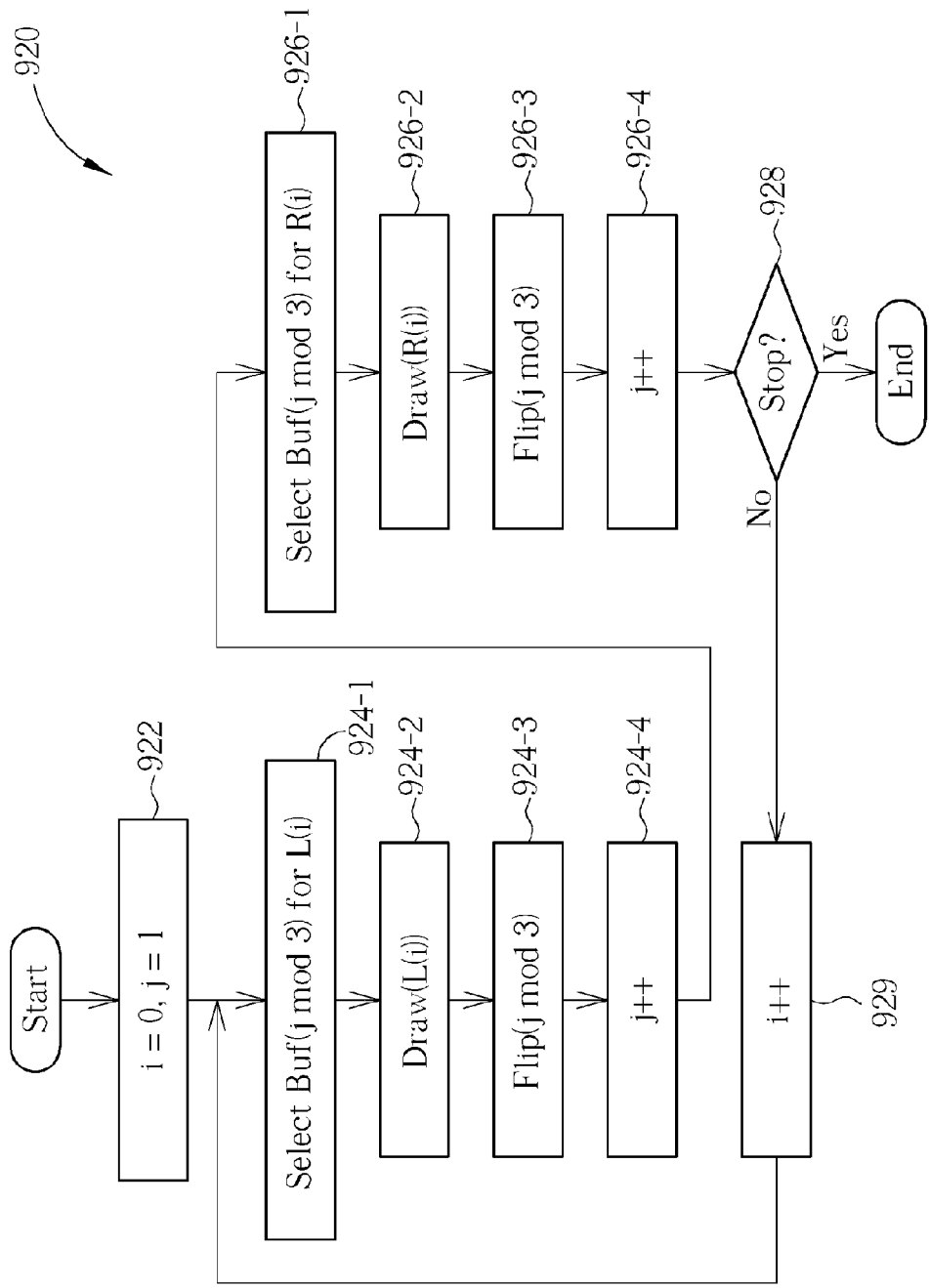

Referring to FIG. 6D, the working flow 920 illustrate some implementation details involved with the method 910 shown in FIG. 4 according to a special case of this embodiment, where at least a portion of these implementation details can be described with pseudo codes for better comprehension of the buffer control shown in FIG. 6C. In particular, the working flow 920 can be applied to the aforementioned video processing circuit. Please note that the working flow 920 shown in FIG. 6D (and more particularly, the steps thereof) is for illustrative purposes only, and is not meant to be a limitation of the present invention. The working flow 920 is described as follows.

In Step 922, the controller 130 executes the commands i=0 and j=1, in order to set initial values of the indexes i and j as 0 and 1, respectively.

In Step 924-1, under the control of the controller 130, and more particularly, the control of the switching control signal $S_{SW}$, the buffering module 140 (or the buffer switching unit 142 therein) selects the buffer Buf(j mod 3) for the left 3D frame L(i), where the notation "mod" represent the operator of the modulo operation.

In Step 924-2, the aforementioned video processing circuit (and more particularly, the controller 130 and/or the decoder 120L) executes the drawing command Draw(L(i)), in order to draw the left 3D frame L(i). In practice, the drawing command Draw(L(i)) can be a procedure comprising a plurality of commands regarding the left 3D frame L(i), and therefore, may comprise a plurality of sub-steps.

In Step 924-3, the controller 130 executes the flip command Flip(j mod 3), in order to flip the buffer Buf(j mod 3) to be an on-screen buffer. For example, under the control of the controller 130, and more particularly, the control of the switching control signal $S_{SW}$, the buffering module 140 (or the buffer switching unit 142 therein) flips the buffer Buf(j mod 3) to be an on-screen buffer, where the multiplexer 150 is utilized for multiplexing/selecting a 3D frame from a set of 3D frames to be displayed respectively for the two eyes (i.e. a left 3D frame and a right 3D frame). This is for illustrative purposes only, and is not meant to be a limitation of the present invention. According to a variation of this embodiment, under the control of the controller 130, and more particularly, the control of the selection signal $S_{SEL}$, the multiplexer 150 flips the buffer Buf(j mod 3) to be an on-screen buffer.

In Step 924-4, the controller 130 executes the command j++, in order to increase the value of the index j.

In Step 926-1, under the control of the controller 130, and more particularly, the control of the switching control signal $S_{SW}$, the buffering module 140 (or the buffer switching unit 142 therein) selects the buffer Buf(j mod 3) for the right 3D frame R(i).

In Step 926-2, the aforementioned video processing circuit (and more particularly, the controller 130 and/or the decoder 120R) executes the drawing command Draw(R(i)), in order to draw the right 3D frame R(i). In practice, the drawing command Draw(R(i)) can be a procedure comprising a plurality of commands regarding the right 3D frame R(i), and therefore, may comprise a plurality of sub-steps.

In Step 926-3, the controller 130 executes the flip command Flip(j mod 3), in order to flip the buffer Buf(j mod 3) to be an on-screen buffer. For example, under the control of the controller 130, and more particularly, the control of the switching control signal $S_{SW}$, the buffering module 140 (or the buffer switching unit 142 therein) flips the buffer Buf(j mod 3) to be an on-screen buffer, where the multiplexer 150 is utilized for multiplexing/selecting a 3D frame from a set of 3D frames to be displayed respectively for the two eyes (i.e. a left 3D frame and a right 3D frame). This is for illustrative purposes only, and is not meant to be a limitation of the present invention. According to a variation of this embodiment, under the control of the controller 130, and more particularly, the control of the selection signal $S_{SEL}$, the multiplexer 150 flips the buffer Buf(j mod 3) to be an on-screen buffer.

In Step 926-4, the controller 130 executes the command j++, in order to increase the value of the index j.

In Step 928, the controller 130 checks whether stopping the working flow 920 is required. When it is detected that stopping the working flow 920 is required, the working flow 920 is ended; otherwise, Step 929 is entered.

In Step 929, the controller 130 executes the command i++, in order to increase the value of the index i. After Step 929 is executed, Step 924-1 is re-entered.

Figure 7A:
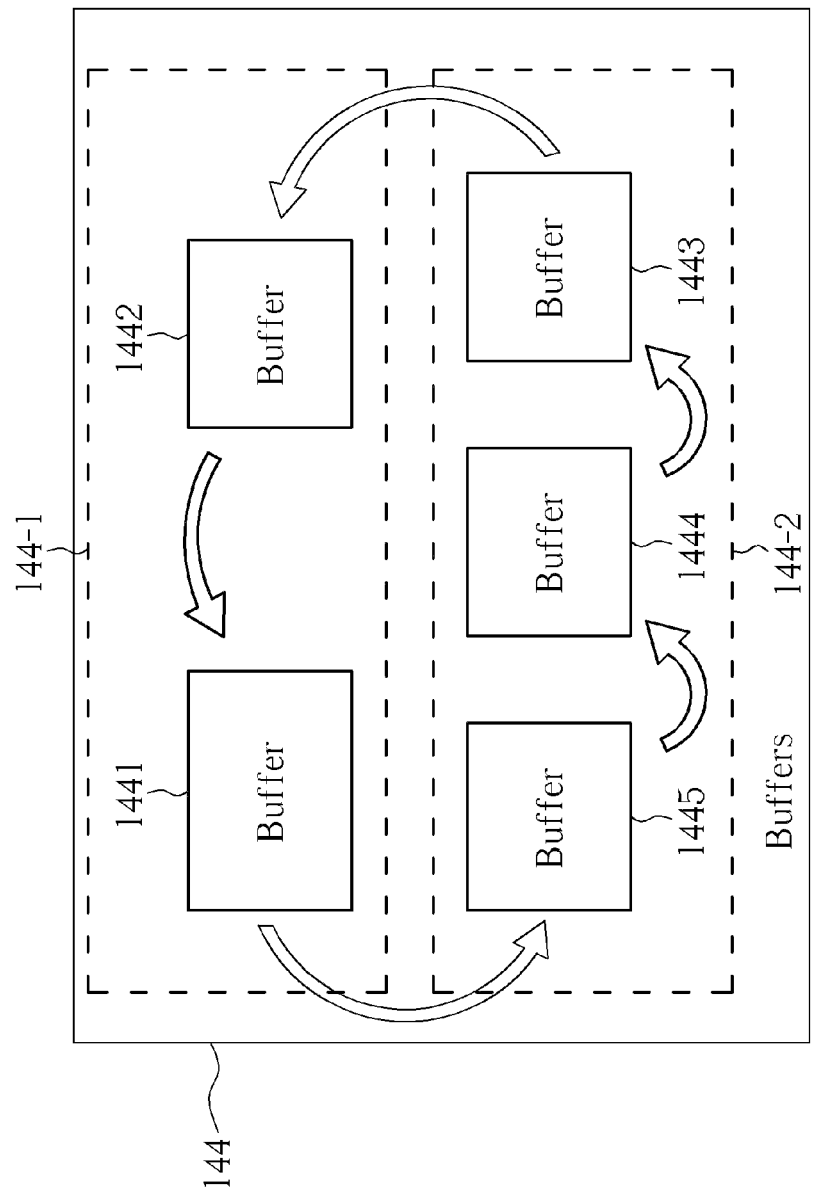
FIGS. 7A-7D illustrate exemplary buffer control of a plurality of buffers involved with the method shown in FIG. 4 according to another embodiment of the present invention.

Referring to FIG. 7A, the number of the plurality of buffers 144 can be equal to five, where the buffers 144 comprise buffers 1441, 1442, 1443, 1444, and 1445. More particularly, referring to the upper portion 144-1 shown in FIG. 7A, two of the buffers 1441, 1442, 1443, 1444, and 1445 are selected as the two of the plurality of buffers 144 mentioned in Step 912 at a specific moment. In addition, referring to the lower portion 144-2 shown in FIG. 7A, the other buffers of the buffers 1441, 1442, 1443, 1444, and 1445 are selected as the at least one other buffer of the plurality of buffers 144 mentioned in Step 914 at this specific moment. For better comprehension, FIG. 7A illustrates an exemplary situation where the buffers 1441 and 1442 are selected as the two of the plurality of buffers 144 mentioned in Step 912 and the buffer 1443, 1444, and 1445 are selected as the at least one other buffer of the plurality of buffers 144 mentioned in Step 914 at this specific moment.

In practice, under the control of the controller 130, and more particularly, the control of the switching control signal $S_{SW}$, in a situation where the buffering module 140 utilizes two of the buffers 1441, 1442, 1443, 1444, and 1445 as two on-screen buffer respectively storing a left 3D frame to be displayed for the left eye of the user and a right 3D frame to be displayed for the right eye of the user, the buffering module 140 utilizes the other buffers of the buffers 1441, 1442, 1443, 1444, and 1445 as off-screen buffers. For example, in a situation where the buffering module 140 utilizes the buffers 1441 and 1442 as the two on-screen buffer respectively storing a left 3D frame to be displayed for the left eye of the user and a right 3D frame to be displayed for the right eye of the user, the buffering module 140 utilizes the other buffers 1443, 1444, and 1445 as off-screen buffers. As a result, the buffers 1441 and 1442 are arranged to output a set of 3D frames to be displayed respectively for the two eyes (e.g. the left 3D frame and the right 3D frame).

Figure 7B:
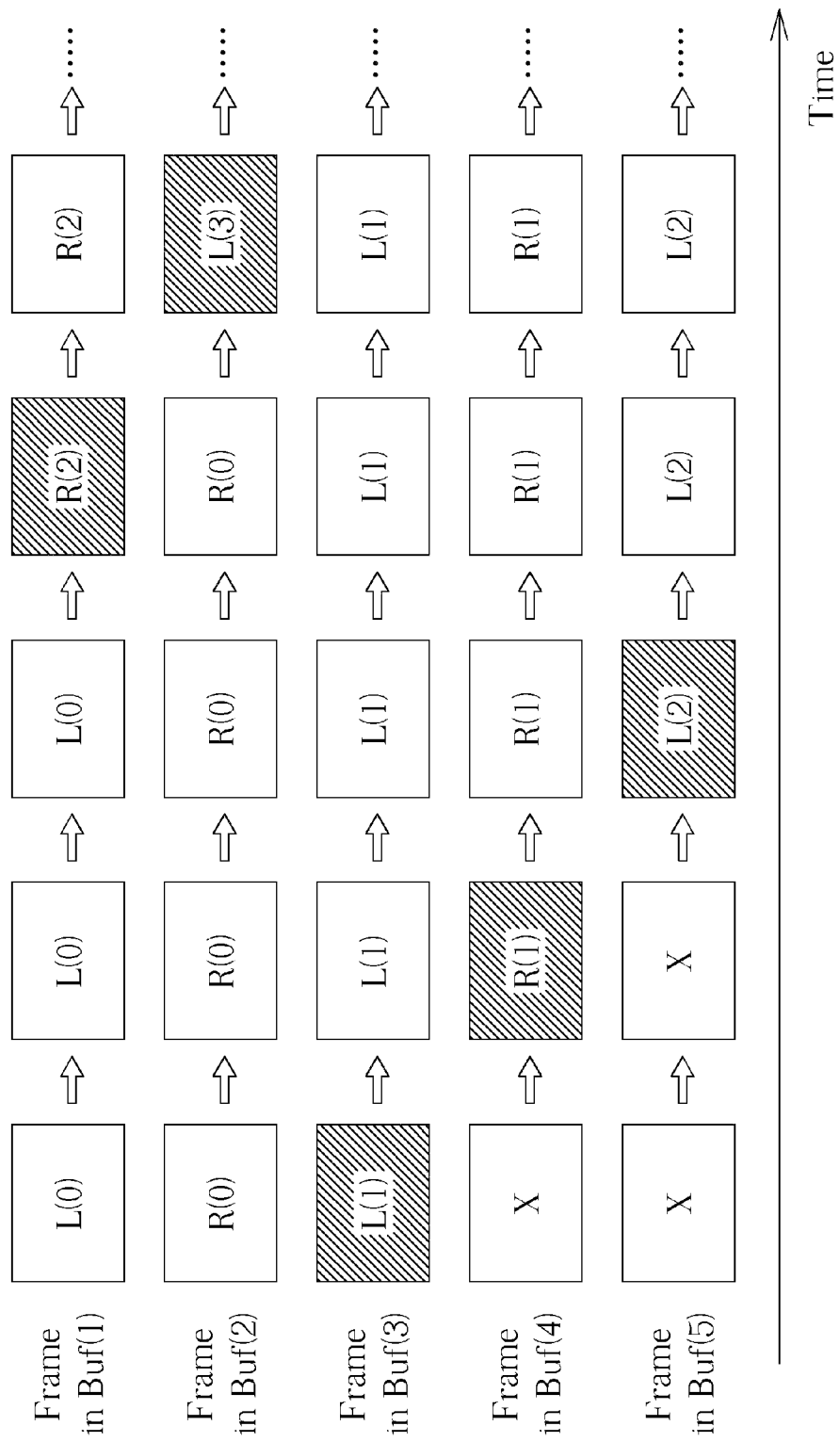

Referring to FIG. 7B, suppose that the notations Buf(1), Buf(2), Buf(3), Buf(4), and Buf(5) are utilized for representing the buffers 1441, 1442, 1443, 1444, and 1445, respectively. When the buffers Buf(1) and Buf(2) respectively store a left 3D frame L(0) and a right 3D frame R(0), another buffer of the buffers Buf(1), Buf(2), Buf(3), Buf(4), and Buf(5), such as the buffer Buf(3), can be utilized for drawing the next left 3D frame L(1), and is therefore illustrated with a shaded block for better comprehension. Each transition of the contents of the buffers Buf(1), Buf(2), Buf(3), Buf(4), and Buf(5) corresponds to a vertical synchronization signal such as the aforementioned vertical synchronization signal VSYNC (not shown in FIG. 7B). As a result of applying the method 910 shown in FIG. 4, the content of the buffer Buf(1) in different periods of the vertical synchronization signal VSYNC can be the associated 3D frames in the sequence {L(0), L(0), L(0), R(2), R(2), . . . }, respectively. In addition, the content of the buffer Buf(2) in different periods of the vertical synchronization signal VSYNC can be the associated 3D frames in the sequence {R(0), R(0), R(0), R(0), L(3), . . . }, respectively. Additionally, the content of the buffer Buf(3) in different periods of the vertical synchronization signal VSYNC can be the associated 3D frames in the sequence {L(1), L(1), L(1), L(1), L(1), . . . }, respectively. Regarding the buffers Buf(4) and Buf(5), the notation X shown in FIG. 7B represents the meaning of "undefined" (or undetermined) in this embodiment, where the buffer contents labeled with the notation X are typically undefined (or undetermined). Thus, the content of the buffer Buf(4) in different periods of the vertical synchronization signal VSYNC can be the associated elements/3D frames in the sequence {X, R(1), R(1), R(1), R(1), . . . }, respectively. In addition, the content of the buffer Buf(5) in different periods of the vertical synchronization signal VSYNC can be the associated elements/3D frames in the sequence {X, X, L(2), L(2), L(2), . . . }, respectively.

Figure 7C:
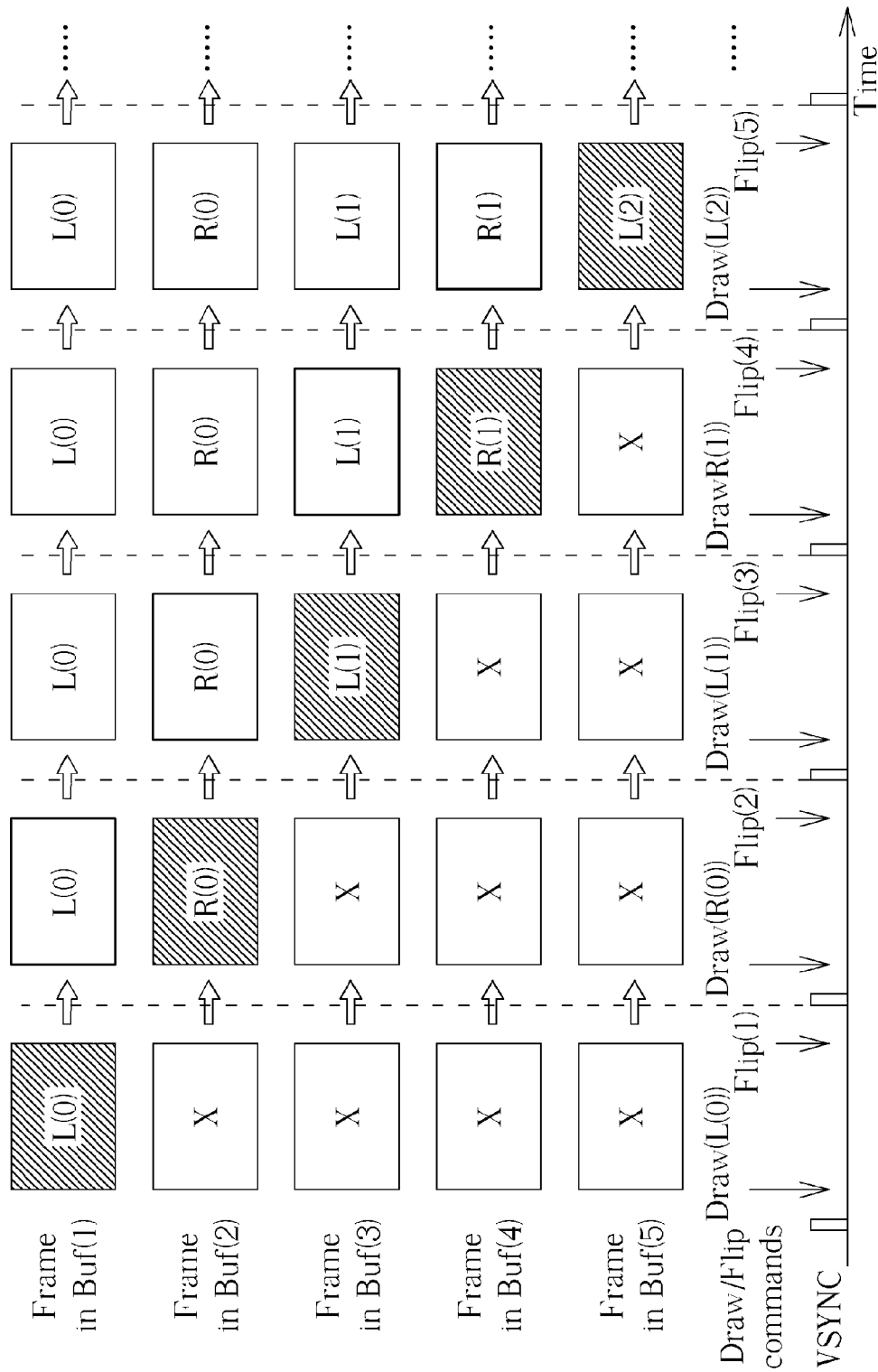

Referring to FIG. 7C, the vertical synchronization signal VSYNC is illustrated for reference, where each transition of the contents of the buffers Buf(1), Buf(2), Buf(3), Buf(4), and Buf(5) corresponds to a pulse of the vertical synchronization signal VSYNC. Some drawing commands such as the drawing commands DRAW(L(0)), DRAW(R(0)), DRAW(L(1)), DRAW(R(1)), DRAW(L(2)), DRAW(R(2)), . . . , etc. are respectively utilized for drawing the 3D frames L(0), R(0), L(1), R(1), L(2), R(2), . . . , etc., some of which are illustrated with shaded blocks for better comprehension. In addition, some flip commands such as the flip commands Flip(1), Flip (2), Flip(3), Flip(4), and Flip(5) are respectively utilized for flipping the buffers Buf(1), Buf(2), Buf(3), Buf(4), and Buf (5) to be on-screen buffers (which are illustrated with blocks depicted using bold lines) at the time points of the respective coming pulses of the vertical synchronization signal VSYNC. Similarly, the notation X shown in FIG. 7C represents the meaning of "undefined" (or undetermined) in this embodiment, where the buffer contents labeled with the notation X are typically undefined (or undetermined).

Please note that, in this embodiment, when one of the buffers Buf(1), Buf(2), Buf(3), Buf(4), and Buf(5) is just flipped to be an on-screen buffer, the buffer storing the content that has just been removed from the screen becomes in an off-screen state. This is for illustrative purposes only, and is not meant to be a limitation of the present invention. According to a variation of this embodiment, in a situation where the number of the buffers 144 is not less than four, the two of the plurality of buffers 144 mentioned in Step 912 (e.g. the upper portion 144-1 shown in FIG. 7A) can be in an on-screen state at the same time at the aforementioned specific moment, and the at least one other buffer of the plurality of buffers 144 mentioned in Step 914 can be in an off-screen state at this specific moment. In addition, at the end of the current period, such as the time point when the coming pulse of the vertical synchronization period VSYNC appears, the original two buffers that are regarded as the two of the plurality of buffers 144 mentioned in Step 912 then enter an off-screen state at the same time, where some other two of the buffers 144 replace the original two buffers and become in an on-screen state at the same time.

In addition, some drawing commands such as the drawing commands DRAW(L(0)), DRAW(R(0)), DRAW(L(1)), DRAW(R(1)), DRAW(L(2)), DRAW(R(2)), . . . , etc. are taken as examples of the associated commands for generating/obtaining the latest 3D frames in the embodiment shown in FIG. 7C. This is for illustrative purposes only, and is not meant to be a limitation of the present invention. According to a variation of this embodiment, other kinds of commands can be utilized for generating/obtaining the latest 3D frames.

Figure 7D:
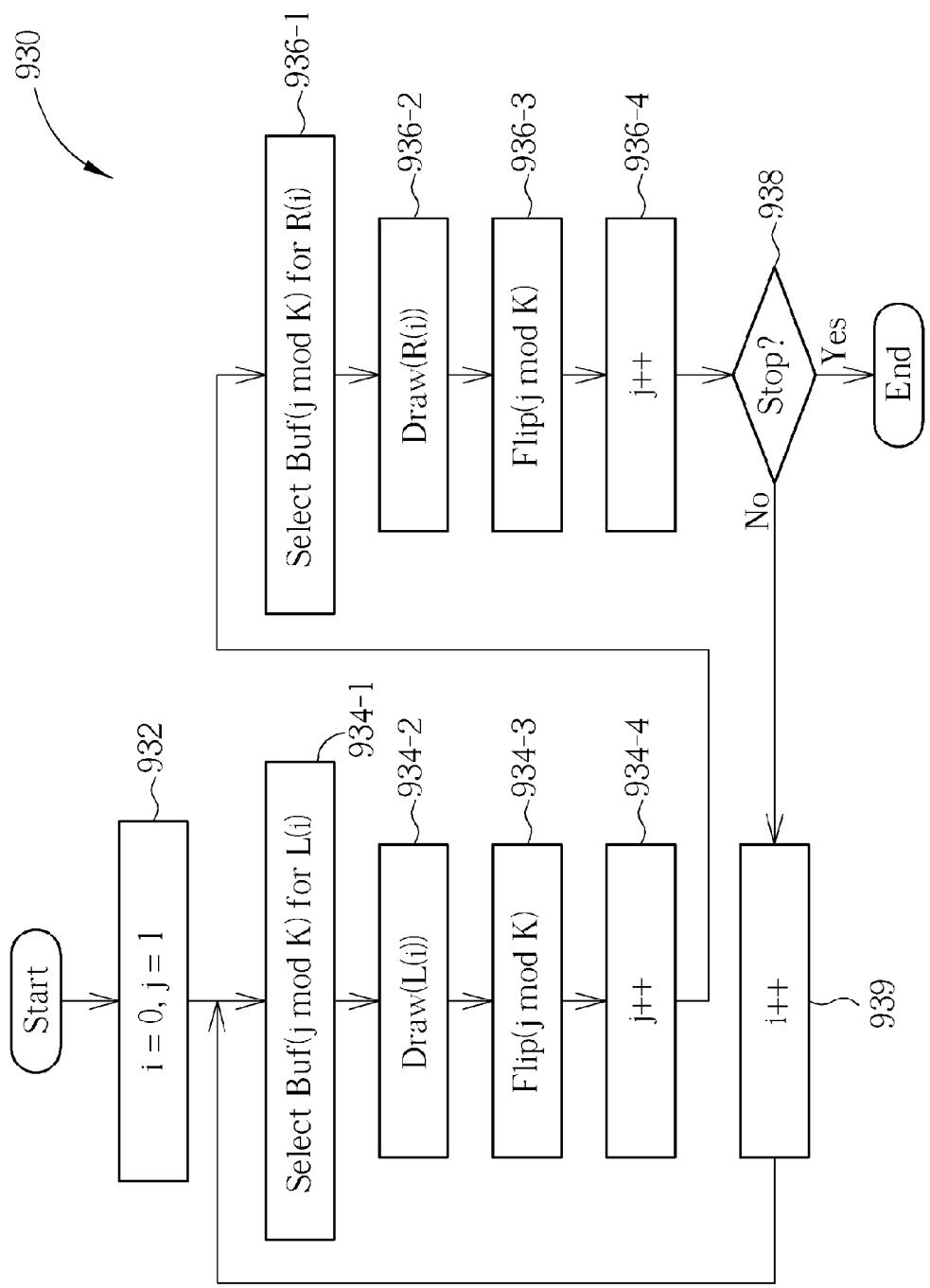

Referring to FIG. 7D, the working flow 930 illustrate some implementation details involved with the method 910 shown in FIG. 4 according to a special case of this embodiment, where at least a portion of these implementation details can be described with pseudo codes for better comprehension of the buffer control shown in FIG. 7C. In particular, the working flow 930 can be applied to the aforementioned video processing circuit. Please note that the working flow 930 shown in FIG. 7D (and more particularly, the steps thereof) is for illustrative purposes only, and is not meant to be a limitation of the present invention. The working flow 930 is described as follows.

In Step 932, the controller 130 executes the commands i=0 and j=1, in order to set initial values of the indexes i and j as 0 and 1, respectively.

In Step 934-1, under the control of the controller 130, and more particularly, the control of the switching control signal $S_{SW}$, the buffering module 140 (or the buffer switching unit 142 therein) selects the buffer Buf(j mod K) for the left 3D frame L(i), where K is a positive integer, and more particularly, is equal to five in this embodiment.

In Step 934-2, the aforementioned video processing circuit (and more particularly, the controller 130 and/or the decoder 120L) executes the drawing command Draw(L(i)), in order to draw the left 3D frame L(i). In practice, the drawing command Draw(L(i)) can be a procedure comprising a plurality of commands regarding the left 3D frame L(i), and therefore, may comprise a plurality of sub-steps.

In Step 934-3, the controller 130 executes the flip command Flip(j mod K), in order to flip the buffer Buf(j mod K) to be an on-screen buffer. For example, under the control of the controller 130, and more particularly, the control of the switching control signal $S_{SW}$, the buffering module 140 (or the buffer switching unit 142 therein) flips the buffer Buf(j mod K) to be an on-screen buffer, where the multiplexer 150 is utilized for multiplexing/selecting a 3D frame from a set of 3D frames to be displayed respectively for the two eyes (i.e. a left 3D frame and a right 3D frame). This is for illustrative purposes only, and is not meant to be a limitation of the present invention. According to a variation of this embodiment, under the control of the controller 130, and more particularly, the control of the selection signal $S_{SEL}$, the multiplexer 150 flips the buffer Buf(j mod K) to be an on-screen buffer.

In Step 934-4, the controller 130 executes the command j++, in order to increase the value of the index j.

In Step 936-1, under the control of the controller 130, and more particularly, the control of the switching control signal $S_{SW}$, the buffering module 140 (or the buffer switching unit 142 therein) selects the buffer Buf(j mod K) for the right 3D frame R(i).

In Step 936-2, the aforementioned video processing circuit (and more particularly, the controller 130 and/or the decoder 120R) executes the drawing command Draw(R(i)), in order to draw the right 3D frame R(i). In practice, the drawing command Draw(R(i)) can be a procedure comprising a plurality of commands regarding the right 3D frame R(i), and therefore, may comprise a plurality of sub-steps.

In Step 936-3, the controller 130 executes the flip command Flip(j mod K), in order to flip the buffer Buf(j mod K) to be an on-screen buffer. For example, under the control of the controller 130, and more particularly, the control of the switching control signal $S_{SW}$, the buffering module 140 (or the buffer switching unit 142 therein) flips the buffer Buf(j mod K) to be an on-screen buffer, where the multiplexer 150 is utilized for multiplexing/selecting a 3D frame from a set of 3D frames to be displayed respectively for the two eyes (i.e. a left 3D frame and a right 3D frame). This is for illustrative purposes only, and is not meant to be a limitation of the present invention. According to a variation of this embodiment, under the control of the controller 130, and more particularly, the control of the selection signal $S_{SEL}$, the multiplexer 150 flips the buffer Buf(j mod K) to be an on-screen buffer.

In Step 936-4, the controller 130 executes the command j++, in order to increase the value of the index j.

In Step 938, the controller 130 checks whether stopping the working flow 930 is required. When it is detected that stopping the working flow 930 is required, the working flow 930 is ended; otherwise, Step 939 is entered.

In Step 939, the controller 130 executes the command i++, in order to increase the value of the index i. After Step 939 is executed, Step 934-1 is re-entered.

Figure 8A:
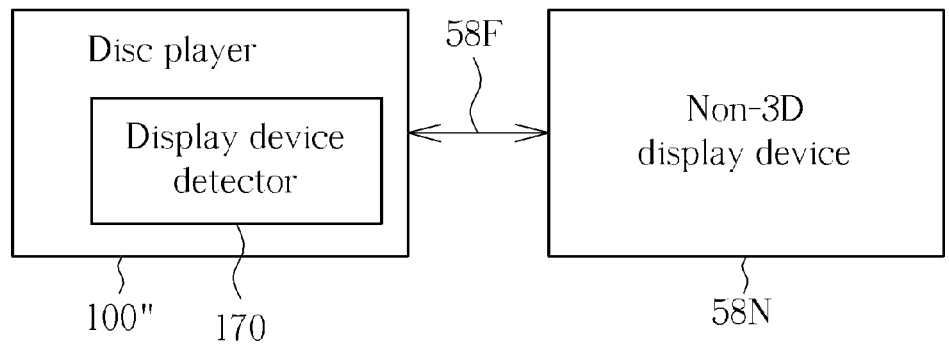
FIGS. 8A-8C illustrate some implementation details involved with the method shown in FIG. 4 according to another embodiment of the present invention.
Figure 8B:
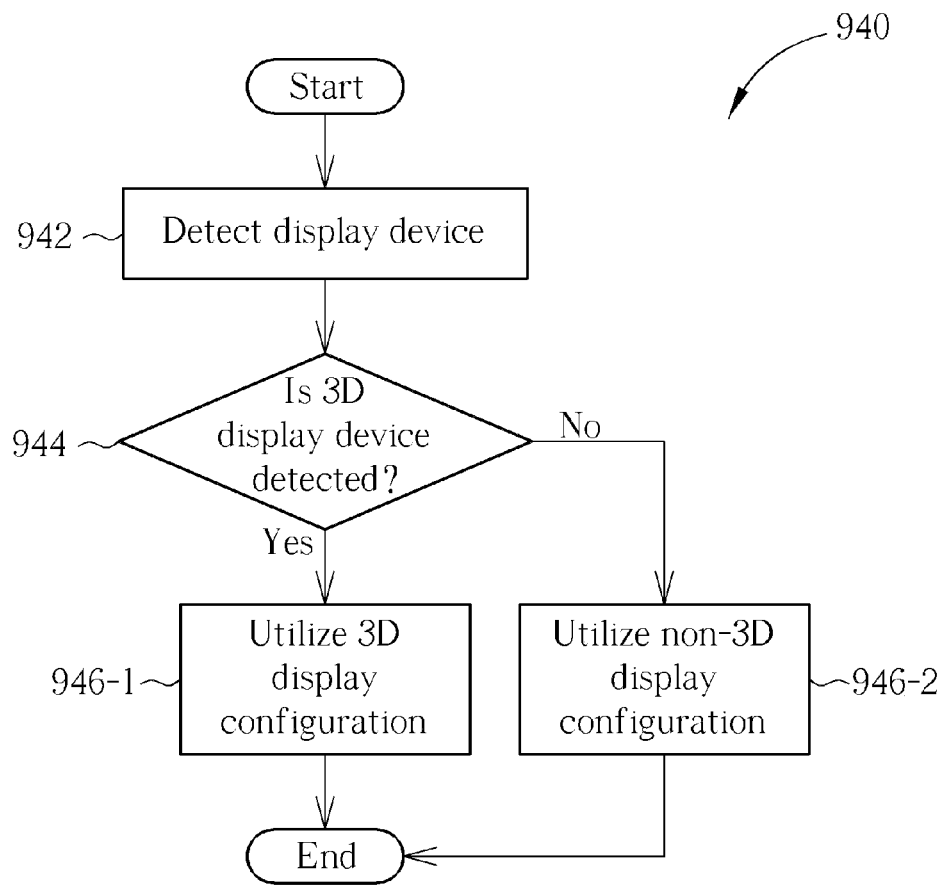
Figure 8C:
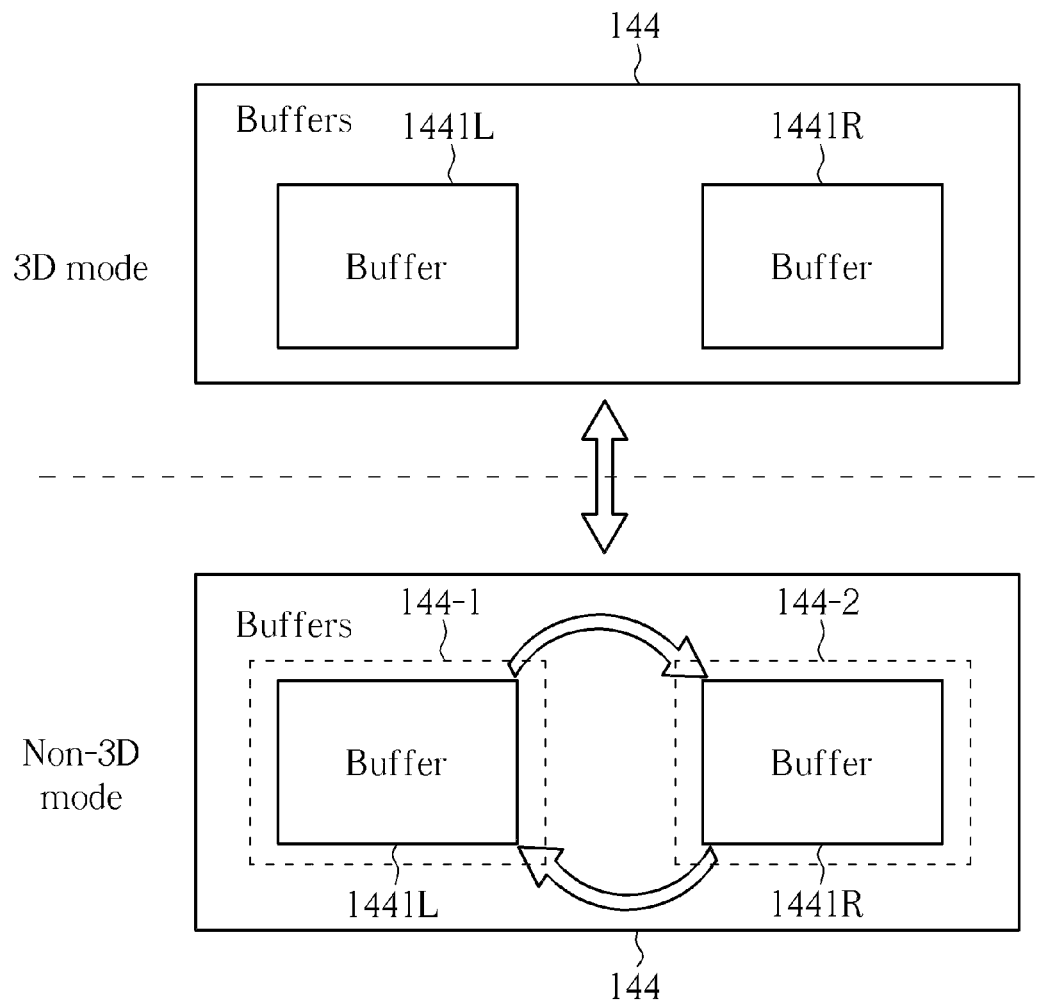

FIGS. 8A-8C illustrate some implementation details involved with the method 910 shown in FIG. 4 according to another embodiment of the present invention. According to this embodiment, in addition to the components shown in FIG. 1A, the video processing circuit mentioned above further comprises a display device detector 170 arranged to detect the type (e.g. a 3D type or a non-3D type) of a display device coupled to the aforementioned video display system, which is labeled with the numeral 100" in FIG. 8A in response to the change in architecture. For example, the connection 58F between the video display system 100" and the display device coupled to the video display system 100" can be a High-Definition Multimedia Interface (HDMI) connection.

According to this embodiment, the display device detector 170 is arranged to detect whether the display device coupled to the video display system 100" is a 3D display device. Referring to FIG. 8B, the working flow 940 illustrates related operations regarding the type detection, and can be described as follows.

In Step 942, under control of the controller 130, the display device detector 170 detects the display device, and more particularly, the type of the display device coupled to the video display system 100".

In Step 944, based upon the detection performed by the display device detector 170, the controller 130 checks whether the display device coupled to the video display system 100" is a 3D display device. When a 3D display device is detected (e.g. in a situation where the 3D display device 58 shown in FIG. 1B is coupled to the video display system 100"), Step 946-1 is entered; otherwise (e.g. in a situation where the non-3D display device 58N shown in FIG. 8A is coupled to the video display system 100"), Step 946-2 is entered.

In Step 946-1, the controller 130 utilizes a 3D display configuration, such as the 3D display configuration regarding the implementation details disclosed in any of the embodiments respectively shown in FIGS. 6A-6D and FIGS. 7A-7D and some variations thereof. As a result, the buffering module 140 operates in a 3D mode corresponding to the 3D display configuration.

In Step 946-2, the controller 130 utilizes a non-3D display configuration, such as a normal configuration for 2D display. As a result, the buffering module 140 operates in a non-3D mode corresponding to the non-3D display configuration.

Please note that the working flow 940 can be utilized multiple times when needed. Based upon the working flow 940, the video display system 100" can dynamically switch between the 3D mode and the non-3D mode. For example, when the connection 58F is established, the video display system 100" can dynamically switch between the 3D mode and the non-3D mode by executing the working flow 940 one or more times. In another example, in a situation where the type (e.g. the 3D type or the non-3D type) of the aforementioned display device coupled to the video display system 100" is changeable, when the type is changed, the video display system 100" can dynamically switch between the 3D mode and the non-3D mode by executing the working flow 940 one or more times.

FIG. 8C illustrates some implementation details involved with the method 910 shown in FIG. 4 according to a special case of this embodiment, where the aforementioned first set of buffers 1441L and 1441R are taken as examples of the buffers 144 for explaining the difference between the 3D mode and the non-3D mode. Suppose that only the first set of buffers 1441L and 1441R are available within the buffers 144 in this special case. In the 3D mode, the buffers 1441L and 1441R are utilized for temporarily storing a left 3D frame and a right 3D frame, respectively. When the controller 130 determines to switch from the 3D mode to the non-3D mode, one of the buffers 1441L and 1441R can be utilized as an on-screen buffer at a specific moment, and the other of the buffers 1441L and 1441R can be utilized as an off-screen buffer at this specific moment. As the number of buffers may be extremely limited in a situation where associated hardware resources are implemented with cheap or low end components, the number of buffers in the portion 144-1 and the number of buffers in the portion 144-2 can be decreased in some situations. For example, in the situation illustrated in FIG. 8C, the number of buffers in the portion 144-1 is equal to one, and the number of buffers in the portion 144-2 is equal to one.

According to a variation of the embodiment shown in FIG. 8C, based upon some default settings and/or user settings, the aforementioned video processing circuit (and more particularly, the controller 130 thereof) allows the user to manually control the switching between the 3D mode and the non-3D mode.

It is an advantage of the present invention that, based upon the architecture of the embodiments/variations disclosed above, the goal of maintaining the overall performance can be achieved. More particularly, in a situation where associated hardware resources are implemented with cheap or low end components, the present invention method and the associated video processing circuit and the associated video display system can still maintain the overall performance. Therefore, the related art problems can no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for performing video display control within a video display system, the method comprising:
dynamically utilizing two of a plurality of buffers as on-screen buffers for three-dimensional (3D) frames, wherein the plurality of buffers is positioned within the video display system; and
during utilizing any of the two of the plurality of buffers as an on-screen buffer, dynamically utilizing at least one other buffer of the plurality of buffers as at least one off-screen buffer for at least one 3D frame;
wherein the two of the buffers utilized as two on-screen buffer respectively storing a first left 3D frame to be displayed for a left eye of a user and a first right 3D frame to be displayed for a right eye of the user; and
wherein the at least one other buffer utilized as one off-screen buffer alternately stores a second left 3D frame to be displayed for the left eye of the user and a second right 3D frame to be displayed for the right eye of the user.

2. The method of claim 1, wherein the step of dynamically utilizing the two of the plurality of buffers as the on-screen buffers for the 3D frames further comprises:
respectively utilizing the two of the plurality of buffers as on-screen buffers in different periods.

3. The method of claim 2, wherein the step of dynamically utilizing the two of the plurality of buffers as the on-screen buffers for the 3D frames further comprises:
respectively utilizing the two of the plurality of buffers as on-screen buffers in different periods, with aid of a multiplexer within the video display system, wherein the multiplexer is arranged to multiplex an output of one of the buffers.

4. The method of claim 2, wherein the different periods are different periods of a vertical synchronization signal.

5. The method of claim 1, wherein a number of the plurality of buffers is an odd number.

6. The method of claim 5, wherein the number of the plurality of buffers is equal to three.

7. The method of claim 5, wherein the number of the plurality of buffers is equal to five.

8. The method of claim 1, wherein the step of dynamically utilizing the at least one other buffer of the plurality of buffers as the at least one off-screen buffer for the at least one 3D frame further comprises:
utilizing the other(s) of the buffers as off-screen buffer(s).

9. The method of claim 1, further comprising:
detecting whether a display device coupled to the video display system is a 3D display device.

10. The method of claim 1, wherein the two of the plurality of buffers and the at least one buffer are alternately utilized as two on-screen buffers and one off-screen buffer.

11. The method of claim 10, further comprises:
utilizing the two of the plurality of buffers as an on-screen buffer, and utilizing the at least one other buffer of the plurality of buffers as at least one off-screen buffer during a first period; and
during a second period after the first period, utilizing one of the two of the plurality of buffers as the off-screen buffer, utilizing another one of the two of the plurality of buffers as the on-screen buffer, and utilizing the at least one other buffer of the plurality of buffers as one on-screen buffer.

12. A video processing circuit, the video processing circuit being positioned within a video display system, the video processing circuit comprising:
a controller arranged to control operations of the video processing circuit;
a demultiplexer arranged to demultiplex a three-dimensional (3D) video stream into a left video stream and a right video stream;
two video decoders arranged to respectively decode the left video stream and the right video stream to generate a plurality of 3D frames; and
a buffering module arranged to temporarily store the 3D frames, the buffering module comprising a plurality of buffers, wherein under control of the controller, the buffering module dynamically utilizes two of the plurality of buffers as on-screen buffers for at least a portion of the 3D frames, and under control of the controller, during utilizing any of the two of the plurality of buffers as an on-screen buffer, the buffering module dynamically utilizes at least one other buffer of the plurality of buffers as at least one off-screen buffer for at least one 3D frame;
wherein the two of the buffers utilized as two on-screen buffer respectively storing a first left 3D frame to be displayed for a left eye of a user and a first right 3D frame to be displayed for a right eye of the user; and wherein the at least one other buffer utilized as one off-screen buffer alternately stores a second left 3D frame to be displayed for the left eye of the user and a second right 3D frame to be displayed for the right eye of the user.

13. The video processing circuit of claim 12, wherein the buffering module respectively utilizes the two of the plurality of buffers as on-screen buffers in different periods.

14. The video processing circuit of claim 13, further comprising:
a multiplexer arranged to multiplex an output of one of the buffers;
wherein the buffering module respectively utilizes the two of the plurality of buffers as on-screen buffers in different periods, with aid of the multiplexer.

15. The video processing circuit of claim 13, wherein the different periods are different periods of a vertical synchronization signal.

16. The video processing circuit of claim 12, wherein a number of the plurality of buffers is an odd number.

17. The video processing circuit of claim 16, wherein the number of the plurality of buffers is equal to three.

18. The video processing circuit of claim 16, wherein the number of the plurality of buffers is equal to five.

19. The video processing circuit of claim 12, wherein the buffering module utilizes the other(s) of the buffers as off-screen buffer(s).

20. The video processing circuit of claim 12, further comprising:
a display device detector arranged to detect whether a display device coupled to the video display system is a 3D display device.

21. The video processing circuit of claim 12, wherein the two of the plurality of buffers and the at least one buffer are alternately utilized as two on-screen buffers and one off-screen buffer.

22. The video processing circuit of claim 21, wherein under control of the controller, the buffering module further utilizes the two of the plurality of buffers as an on-screen buffer, and utilizing the at least one other buffer of the plurality of buffers as at least one off-screen buffer during a first period; and
during a second period after the first period, utilizes one of the two of the plurality of buffers as the off-screen buffer, utilizing another one of the two of the plurality of buffers as the on-screen buffer, and utilizing the at least one other buffer of the plurality of buffers as one on-screen buffer.

23. A video display system, comprising:
a video processing circuit, comprising:
a controller arranged to control operations of the video processing circuit;
a demultiplexer arranged to demultiplex a three-dimensional (3D) video stream into a left video stream and a right video stream;
two video decoders arranged to respectively decode the left video stream and the right video stream to generate a plurality of 3D frames; and
a buffering module arranged to temporarily store the 3D frames, the buffering module comprising a plurality of buffers, wherein under control of the controller, the buffering module dynamically utilizes two of the plurality of buffers as on-screen buffers for at least a portion of the 3D frames, and under control of the controller, during utilizing any of the two of the plurality of buffers as an on-screen buffer, the buffering module dynamically utilizes at least one other buffer of the plurality of buffers as at least one off-screen buffer for at least one 3D frame;
wherein the two of the buffers utilized as two on-screen buffer respectively storing a first left 3D frame to be displayed for a left eye of a user and a first right 3D frame to be displayed for a right eye of the user; and
wherein the at least one other buffer utilized as one off-screen buffer alternately stores a second left 3D frame to be displayed for the left eye of the user and a second right 3D frame to be displayed for the right eye of the user.

24. The video display system of claim 23, wherein the buffering module respectively utilizes the two of the plurality of buffers as on-screen buffers in different periods.

25. The video display system of claim 24, wherein the video processing circuit further comprises:
a multiplexer arranged to multiplex an output of one of the buffers;
wherein the buffering module respectively utilizes the two of the plurality of buffers as on-screen buffers in different periods, with aid of the multiplexer.

26. The video display system of claim 24, wherein the different periods are different periods of a vertical synchronization signal.

27. The video display system of claim 23, wherein a number of the plurality of buffers is an odd number.

28. The video display system of claim 27, wherein the number of the plurality of buffers is equal to three.

29. The video display system of claim 27, wherein the number of the plurality of buffers is equal to five.

30. The video display system of claim 23, wherein the buffering module utilizes the other(s) of the buffers as off-screen buffer(s).

31. The video display system of claim 23, wherein the video processing circuit further comprises:
a display device detector arranged to detect whether a display device coupled to the video display system is a 3D display device.

32. The video display system of claim 23, wherein the two of the plurality of buffers and the at least one buffer alternately are utilized as two on-screen buffers and one off-screen buffer.

33. The video display system of claim 32, wherein under control of the controller, the buffering module further utilizes the two of the plurality of buffers as an on-screen buffer, and utilizing the at least one other buffer of the plurality of buffers as at least one off-screen buffer during a first period; and
during a second period after the first period, utilizes one of the two of the plurality of buffers as the off-screen buffer, utilizing another one of the two of the plurality of buffers as the on-screen buffer, and utilizing the at least one other buffer of the plurality of buffers as one on-screen buffer.

* * * * *